(12) United States Patent
Gupta et al.

(10) Patent No.: US 11,645,832 B1
(45) Date of Patent: May 9, 2023

(54) SENSOR FUSION FOR PRECIPITATION DETECTION AND CONTROL OF VEHICLES

(71) Applicant: PlusAI, Inc., Santa Clara, CA (US)

(72) Inventors: Mayank Gupta, Mountain View, CA (US); Anurag Ganguli, Saratoga, CA (US); Timothy P. Daly, Jr., San Jose, CA (US); Amit Kumar, Sunnyvale, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 17/988,430

(22) Filed: Nov. 16, 2022

Related U.S. Application Data

(63) Continuation of application No. 17/830,292, filed on Jun. 1, 2022.

(51) Int. Cl.
| | |
|---|---|
| *G06V 10/80* | (2022.01) |
| *B60W 50/00* | (2006.01) |
| *B60W 50/14* | (2020.01) |
| *G06V 20/56* | (2022.01) |
| *G01S 13/931* | (2020.01) |
| *G01S 13/86* | (2006.01) |
| *G01S 13/95* | (2006.01) |

(52) U.S. Cl.
CPC ........... *G06V 10/811* (2022.01); *B60W 50/00* (2013.01); *B60W 50/14* (2013.01); *G06V 20/56* (2022.01); *B60W 2050/146* (2013.01); *B60W 2420/42* (2013.01); *B60W 2420/52* (2013.01); *B60W 2420/54* (2013.01); *B60W 2555/20* (2020.02); *B60W 2556/35* (2020.02); *B60W 2556/45* (2020.02); *G01S 13/862* (2013.01); *G01S 13/865* (2013.01); *G01S 13/867* (2013.01); *G01S 13/931* (2013.01); *G01S 13/951* (2013.01); *G01S 2013/9323* (2020.01); *G01S 2013/9324* (2020.01)

(58) Field of Classification Search
CPC ..... G06V 10/811; G06V 20/56; B60W 50/00; B60W 50/14; B60W 2556/45; B60W 2555/20; B60W 2556/35; B60W 2050/146
See application file for complete search history.

(56) References Cited

U.S. PATENT DOCUMENTS

| 2018/0141563 | A1 | 5/2018 | Becker |
| 2019/0057261 | A1* | 2/2019 | Tong ................ G06V 30/19173 |

* cited by examiner

*Primary Examiner* — Michael D Lang
(74) *Attorney, Agent, or Firm* — Sheppard Mullin Richter & Hampton LLP

(57) ABSTRACT

An apparatus includes a processor configured to be disposed with a vehicle and a memory coupled to the processor. The memory stores instructions to cause the processor to receive, at least two of: radar data, camera data, lidar data, or sonar data. The sensor data is associated with a predefined region of a vicinity of the vehicle while the vehicle is traveling during a first time period. At least a portion of the vehicle is positioned within the predefined region during the first time period. The method also includes detecting that no other vehicle is present within the predefined region. An environment of the vehicle during the first time period is classified as one state from a set of states that includes at least one of dry, light rain, heavy rain, light snow, or heavy snow, based on at least two of the sensor data to produce an environment classification. An operational parameter of the vehicle based on the environment classification is modified.

20 Claims, 7 Drawing Sheets

SENSOR FUSION FOR PRECIPITATION DETECTION AND CONTROL OF VEHICLES

CROSS-REFERENCE TO RELATED APPLICATIONS

This application is a continuation of U.S. patent application Ser. No. 17/830,292, filed on Jun. 1, 2022 and entitled "SENSOR FUSION FOR PRECIPITATION DETECTION AND CONTROL OF VEHICLES", which is incorporated in its entirety herein by reference.

FIELD

The present disclosure relates to precipitation detection, and more specifically, to using sensor fusion to detect precipitation and dynamically adjusting operational parameters of a vehicle based on the detected precipitation.

BACKGROUND

Vehicles often use local weather information to identify whether they are driving within an operational safety design domain, and can adjust their operational parameters accordingly. Known methods of detecting weather information include using a light detection and ranging (lidar) sensor. Changing environmental and background conditions, however, such as differences in road surfaces, the presence of dynamic obstacles, etc., can make lidar-based weather detection methods less reliable.

Trucks, including semi-trailer trucks (also referred to as tractor units or rigs, and which may be autonomous) are heavy-duty towing vehicles that are often designed to be hitched to trailers of multiple different types, sizes and weights. Weather detection for such large-sized vehicles can pose additional challenges. For example, in view of their large size and weight, it is often desirable for large-sized vehicles to have more time/distance to safely adjust operational parameters based on the weather. Therefore, a need exists to detect weather information more accurately, more quickly, and/or more robustly.

SUMMARY

In some embodiments, an apparatus includes a processor configured to be disposed with a vehicle and a memory coupled to the processor. The memory storing instructions to cause the processor to receive, at the processor, at least two of: radar data, camera data, lidar data, or sonar data. The at least two of radar data, camera data, lidar data, or sonar data is associated with a predefined region of a vicinity of the vehicle while the vehicle is traveling during a first time period. At least a portion of the vehicle is positioned within the predefined region during the first time period. The memory storing instructions to also cause the processor to detect, via the processor and based on at least two of the radar data, the camera data, or the lidar data, that no other vehicle is present within the predefined region during the first time period. In response to detecting that no other vehicle is present within the predefined region during the first time period, an environment of the vehicle during the first time period is classified as one state from a set of states that includes at least one of dry, light rain, heavy rain, light snow, or heavy snow, based on at least two of: the radar data, the camera data, the lidar data, or the sonar data, to produce an environment classification. An operational parameter of the vehicle based on the environment classification is modified.

In some embodiments, a method includes receiving, at a processor of an vehicle, sensor data including at least one of: (1) radar data associated with a predefined region of a vicinity of the vehicle while the vehicle is traveling during a first time period, or (2) camera data associated with the predefined region and the first time period. The method also includes receiving, at the processor of the vehicle, lidar data associated with the predefined region and the first time period. A point cloud based on the lidar data is generated. An environment of the vehicle during the first time period is classified as one state from a set of states that includes at least one of no rain, light rain, heavy rain, light snow, or heavy snow, based on the point cloud, to produce an environment classification.

In some embodiments, a non-transitory, processor-readable medium stores processor-executable instructions that, when executed by a processor, cause the processor to receive, at an vehicle, at least two of: radar data associated with a predefined region of a vicinity of the vehicle while the vehicle is traveling during a first time period, camera data associated with the predefined region and the first time period, lidar data associated with the predefined region and the first time period, or sonar data associated with the predefined region and the first time period. A current weather condition of an environment in which the vehicle is traveling during the first time period is classified as one state from a set of states that includes at least one of dry, light rain, heavy rain, light snow, or heavy snow, in response to at least one of: (1) detecting, based on at least two of the radar data, the camera data, or the lidar data, that no other vehicle is present within the predefined region during the first time period, or (2) detecting, based on at least one of the camera data or the lidar data, that no tire splash is present in the predefined region. A next action (e.g., an autonomous action) of the vehicle is determined based on the classification.

DETAILED DESCRIPTION

Figure 1:
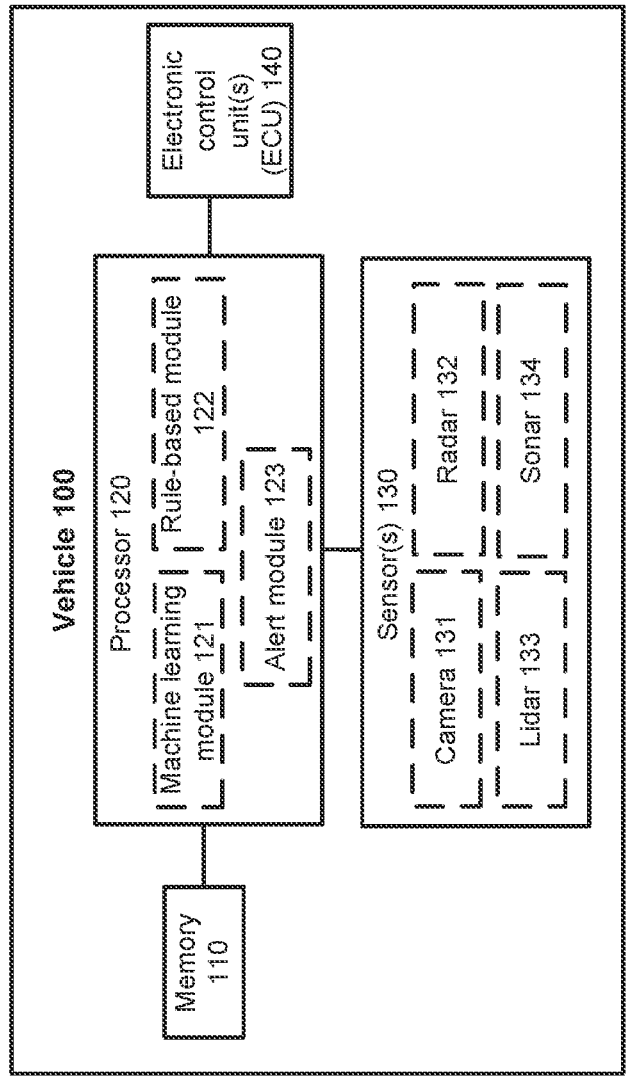
FIG. 1 is a block diagram of a vehicle that can detect precipitation based on sensor fusion, according to an embodiment.

Vehicles (including autonomous vehicles) often face safety challenges when travelling in weather conditions such as rain, snow, fog and haze. Hence, detecting precipitation accurately and robustly is an important consideration for vehicles. Known methods for detecting weather conditions include using a light detection and ranging (lidar) sensor and using local weather information. However the accuracy/reliability of lidar signals are greatly affected by weather elements such as rain, snow, fog, and haze. Moreover, changing environmental and background conditions, such as different traffic conditions, emergency situations, differences in road conditions, the presence of objects/obstacles, etc., can make it difficult to develop a robust methodology to detect precipitation using lidar alone in vehicles.

Trucks (also referred to as tractor units, tractor cabs or rigs) are heavy-duty towing vehicles that are often designed to be hitched to trailers of multiple different types, sizes and weights. Weather detection for large-sized vehicles such as trucks can have greater importance. For example, in view of their large size and weight, it is often desirable for large-sized vehicles to have more time/distance to safely adjust operational parameters based on the weather conditions such as rain, snow, fog and haze.

With the increasing prevalence of self-driving vehicles, systems and methods to detect precipitation and control vehicles accordingly are increasingly desirable. One or more embodiments discussed herein can solve the above-discussed problems by using sensor fusion to detect precipitation and control vehicles (e.g., including autonomous vehicles). As used herein, "sensor fusion" refers to a process in which sensor data from multiple different sensors (e.g., from lidars, radars, cameras, sonars, etc.) are combined to obtain a result with less uncertainty. For example, at least two kinds of sensor data (e.g., lidars, radars, cameras, sonars etc.) associated with a predefined region of the vehicles may be used to detect precipitation within a time period. Moreover, one or more embodiments can classify an environment of the vehicle during the time period as one state from a set of states that includes at least one of dry, light rain, heavy rain, light snow, or heavy snow, to produce an environment classification. One or more embodiments can determine a next action of the vehicle and/or modify an operational parameter of the vehicle based on the environment classification.

As used herein, an "autonomous vehicle" refers to any vehicle (e.g., a ground vehicle such as a car, truck, semi-truck, etc.) having vehicular automation, in that the vehicle is capable of sensing its environment and safely travelling (e.g., along a road) without human input, or with minimal human input. Autonomous vehicles described herein can be configured to wirelessly communicate with one or more remote compute devices, during periods of time when wireless connectivity is available/possible, for a variety of purposes including, but not limited to: receiving third-party data such as weather reports and alerts, receiving global positing system (GPS) data, receiving navigation commands, receiving or transmitting map data, receiving remote sensor data (i.e., data from sensors not disposed within or on the autonomous vehicle, but pertinent to the operations of the autonomous vehicle, such as sensors to detect road moisture, wind and temperature data associated with one or more locations along a route of travel, earthquake detection instruments (e.g., seismometers), etc.), transmitting sensor data generated at the autonomous vehicle, transmitting alerts, etc.

FIG. 1 is a block diagram of a vehicle 100 that can detect precipitation based on sensor fusion, according to an embodiment. The vehicle 100 can be any type of vehicle, such as a car, bus, or semitruck. The vehicle 100 can operate in a manual driving mode, or a vehicle can operate in a manual driving mode during one time period and operate in a partially autonomous mode or a fully autonomous driving mode during a different time period. The vehicle 100 may or may not be an autonomous vehicle. As used herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). In some instances, a given level can include the capabilities included in the lower level(s); for example, level 2 can include the momentary driver assistance of level 0 and the driver assistance of level 1 but can also include additional assistance associated with level 2. An autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. For example, an autonomous capable vehicle can operate in a given level (e.g., level 2), which can be deactivated to allow a driver to operate the vehicle manually (i.e., in a manual driving mode). As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

As shown in FIG. 1, the vehicle 100 includes a processor 120, memory 110 operatively coupled to the processor 120, sensor(s) 130 operatively coupled to the processor 120, and an electronic control unit (ECU) 140 operatively coupled to the processor 120. The processor 120 also has access to an application programming interface (API) (not shown). The ECU 140 is communicatively coupled to the processor 120 through a communications network (not shown). The communications network can be any suitable communications network(s) for transferring data. In some instances, the communication network(s) can be a wired network such as, an Ethernet backbone network, a controller area network (CAN), a local interconnect network (LIN), a media-oriented system transport (MOST), a fiber-optic network, a digital subscription line ("DSL") network, a broadband network, and/or a flexray network. In other instances, the communication network(s) can a wireless network such as, for example, a Wi-Fi or wireless local area network ("WLAN"), a wireless wide area network ("WWAN"), and/or a cellular network. The communication network interconnects ECUs within the vehicle and exchanges information between different ECUs and the processor 120.

The processor 120 includes one or more modules, implemented in software and/or hardware, the one or more modules including a machine learning module 121, a rule-based module 122, and/or an alert module 123. The sensor(s) 130 includes one or more of: a camera 131, a radar 132, a lidar 133, or a sonar device 134. The processor 120 can be configured to perform (or can cause to be performed) any of the techniques discussed herein.

The processor 120 can be or include, for example, a hardware based integrated circuit (IC) or any other suitable processing device configured to run and/or execute a set of instructions or code. For example, the processor 120 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 120 can be configured to run any of the methods and/or portions of methods discussed herein.

The memory 110 can be, for example, a random-access memory (RAM), a memory buffer, a hard drive, a read-only memory (ROM), an erasable programmable read-only memory (EPROM), and/or the like. The memory 110 can be configured to store sensor data collected by the sensor(s) 130, and any other data used by the processor 120 to perform the techniques discussed herein. In some instances, the memory 110 can store, for example, one or more software programs and/or code that can include instructions to cause the processor 120 to perform one or more processes, functions, and/or the like. In some implementations, the memory 110 can include extendible storage units that can be added and used incrementally. In some implementations, the memory 110 can be a portable memory (for example, a flash drive, a portable hard disk, and/or the like) that can be operatively coupled to the processor 120. In some instances, the memory 110 can be remotely operatively coupled with a compute device (not shown). For example, a remote database device can serve as a memory and be operatively coupled to the processor 120.

The memory 110 can store the instructions that can be executed by the processor 120, and/or data detected by the sensor(s) 130. The memory 110 can store one or more software algorithm(s) (not shown). The software algorithm(s) can be, for example, an artificial intelligence (AI) algorithm(s), a machine learning (ML) algorithm(s), an analytical algorithm(s), a rule-based algorithm(s), or a mathematical algorithm(s). After the processor 120 has received the data from the sensor(s) 130, the processor 120 can process the sensor data using software algorithm(s) to classify the environment of the vehicle 100. The software algorithm(s) can classify the current weather condition as one state from a set of states such as dry, light rain, heavy rain, light snow, or heavy snow and/or other types of weather condition associated with a predetermined region of the vehicle 100.

The sensor(s) 130 can include one or more sensors for collecting sensor data associated with a predetermined region of the vehicle 100. The sensor(s) 130 can be used to observe and gather any information that would be useful for performing the techniques discussed herein, such as information associated with an external environment of the vehicle 100 and/or the vehicle 100 itself. The sensor(s) 130 can include, for example, at least one of a camera 131, a radar 132, a lidar 133, or a sonar 134. The sensor(s) 130 can generate sensor data that includes representations of attributes associated with the vehicle 100, such as a speed of the vehicle 100, location, an acceleration of the vehicle 100, a size of the vehicle 100, a weight of the vehicle 100, etc. Additionally or alternatively, the sensor(s) 130 can generate sensor data that includes representations of attributes associated with an external environment of the vehicle 100, such as a speed, location, acceleration, size, type, relative distance, movement pattern, etc. of other vehicles, pedestrians, animals, obstacles, rain drops, snowflakes, haze particle, fog particle etc., and/or location, type, relative distance, size, shape, etc. of signs, lane markers, shoulder areas, roads, buildings, etc. In some implementations, sensor data collected by the sensor(s) 130 includes information representing a topography surrounding the vehicle 100, such as a road, sign, traffic light, walkway, building, body of water, etc. The camera 131 can be for example one or more of: a thermal imager camera, an infrared camera, a stereo camera, a time of flight camera, an red/green/blue (RGB) camera, a 2-D camera, a 3-D camera, a 360-degree camera, etc. The radar 132 can be for example one or more of: an imaging radar, a 3-D radar, a 4-D radar, a short-range radar, a medium-range radar, a long-range radar, a pulse-Doppler radar, a frequency-modulated continuous-wave (FMCW) radar, etc. The lidar 133 can be for example one or more of: an amplitude modulated lidar, a frequency modulated lidar, a mechanical lidar, a microelectromechanical systems lidar, a flash lidar, an optical phase array lidar, a frequency-modulated continuous-wave (FMCW) lidar, a time of flight scanning lidar, etc. The sonar 134 can be for example one or more of: an active sonar, a passive sonar, etc. Of course, other types of sensors exist and the examples above are not meant to be exhaustive.

As mentioned above, the processor 120 includes one or more modules: a machine learning module 121, a rule-based module 122, and an alert module 123. The processor 120 can be configured to perform (or cause to be performed) any of the techniques discussed herein. As sensor data associated with the vehicle 100 and/or the surrounding region of the vehicle 100 is being captured by the sensor(s) 130 (e.g., images are captured by the camera 131, lidar data such as point cloud data captured by lidar 133), processor 120 can use software algorithm(s) such as machine learning algorithms (e.g., a computer vision algorithm that uses a library of programming function such as those in OpenCV) or rule-based algorithms to classify the current weather condition. A rule-based algorithm(s) is an algorithm designed to achieve a result solely based on pre-defined rules. Oftentimes, if-then statements are coded into the system as the pre-defined rules. A machine learning algorithm(s), on the other hand, is an algorithm designed to define its own set of rules based on the large dataset it has access to, and the rules can be updated while in the training process. The machine learning module 121 is configured to use machine learning algorithm(s) to process data by performing sensor fusion for data received from various sensor(s) 130 to classify the weather condition associated with the predefined region of the vehicle 100. The machine learning module 121 can also process the sensor data to detect and track static and/or dynamic objects while the vehicle 100 is moving (e.g., in an autonomous mode). Examples of objects to be detected and tracked can include one or more of people, animals, cars, trucks, bikes, motorcycles, trees, signs, lane markings, cones, and/or rocks. Additional discussion related to object/feature detection are discussed in U.S. Pat. No. 11,042,155, the content of which is incorporated in its entirety herein. The rule-based module 122 is configured to use rule-based algorithm(s) to process data by performing sensor fusion for data received from various sensor(s) 130 to classify the weather condition associated with the predefined region of the vehicle 100. The rule-based module 122 can also process the sensor data to detect and track static and/or dynamic objects while the vehicle 100 is moving (e.g., in the autonomous mode). Examples of objects to be detected and tracked can include one or more of people, animals, cars, trucks, bikes, motorcycles, trees, signs, lane markings, cones, and/or rocks. Additional discussion related to object/feature detection are discussed in U.S. Pat. No. 11,042,155, the content of which is incorporated in its entirety herein. The alert module 123 is configured to generate an alert based on the classification of the weather condition. The alert can be an alert to notify the driver of the vehicle 100, or can be transmitted to a remote compute device (not shown). Note that the alert(s) can be audible, visual, vibrating, or any combination of appropriate type of notification methods.

As mentioned above, the processor 120 has access to an application programming interface (API) (not shown). In some implementations, the processor 120 can receive weather data from a remote device (e.g., a third-party compute device providing weather data) via the API.

The vehicle 100 can be, for example, a medium truck, heavy truck, very heavy truck, a vehicle that is greater than 14,000 pounds, a vehicle that is greater than 26,000 pounds, a vehicle that is greater than 70,000 pounds, or a vehicle that is greater than 80,000 pounds. To ensure that larger vehicles have sufficient time/distance to perform appropriate actions, objects and/or weather conditions may be detected sufficiently in advance of the vehicle arriving at the location of the objects and/or weather conditions (e.g., within a predefined distance and/or within a predefined travel time). In one or more implementations, the object can be detected well in advance using long range sensors (e.g., long range radar sensor) included in the sensor(s) 130.

The ECU(s) 140 communicatively coupled to the processor 120 is disposed within the vehicle 100 and is configured to transmit/receive information to/from the processor 120. In some implementations, based on the classification of weather condition by processor 120, the ECU(s) 140 can modify one or more operational parameters of the vehicle 100 to ensure that the vehicle is driving in a safe manner. Examples of modifying operational parameters include, but are not limited to: changing driving speed, adjusting speed of windshield wiper, activating defogging system automatically, executing a fail-safe trajectory (i.e., safely navigate to a safe location and disable the vehicle), or changing limits on maximum steering angle. Of course, other types of operational parameters can be modified, as appropriate, to ensure that the vehicle is driving in a safe manner.

Figure 2:
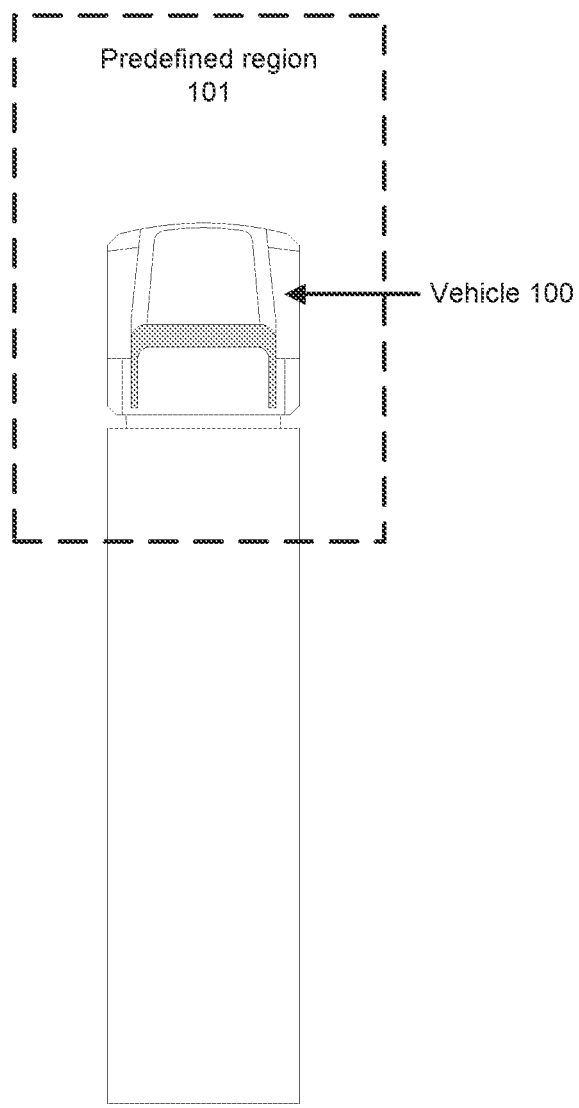
FIG. 2 is a diagram showing a predefined region for the vehicle of FIG. 1.

FIG. 2 is a diagram showing an example of a predefined region for the vehicle of FIG. 1. As shown in FIG. 2, the vehicle 100, having onboard sensor(s) 130 such as camera 131, radar 132, lidar 133, or sonar 134, has a predefined region 101 around the vehicle 100 for the sensor(s) 130 to collect data. The predetermined region 101 is a sensor data collection region. The sensor(s) 130 collects data from the predetermined region 101 and a determination can be made to decide whether any object is present in the predetermined region 101. The object can include for example a vehicle(s), a pedestrian(s), an animal(s), an obstacle(s), a tire splash, a splatter of rain, a splatter of snow/hail, a splatter of mud, a splatter of a bug, etc. Of course, other types of objects can be detected in the predetermined region 101 and the examples above are not meant to be exhaustive. The detection of an object present in the predetermined region 101 can prevent (or reduce the chance of) an incorrect classification of weather condition, which will be discussed in detail in later sections.

Figure 3:
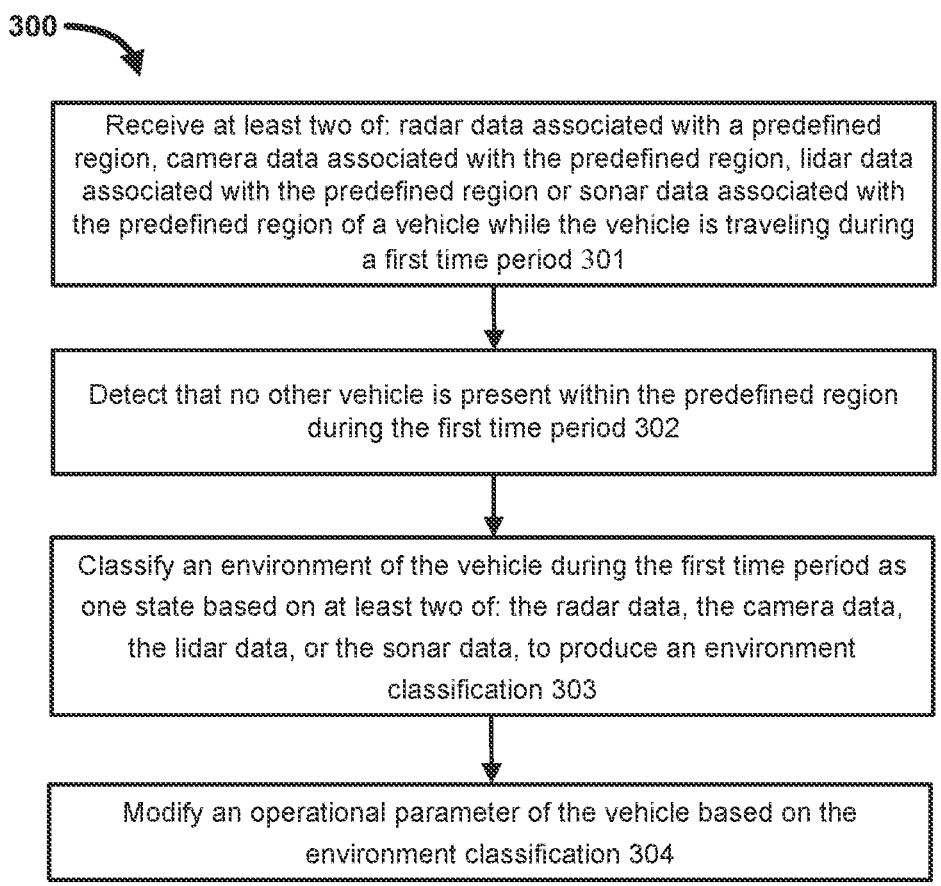
FIG. 3 is a flow diagram of a method for precipitation detection, according to an embodiment.

FIG. 3 is a flow diagram of a method for precipitation detection, according to an embodiment. The method 300 of FIG. 3 can be implemented, for example, using the processor 120 and the ECU 140 of the vehicle 100 in FIG. 1.

As shown in FIG. 3, the method 300 begins with receiving, at 301, at least two kinds of sensor data from sensors (e.g., sensor(s) 130 in FIG. 1) of a vehicle (e.g., vehicle 100 in FIG. 1) while the vehicle is traveling during a first time period. The sensor data received can be at least two of: radar data (e.g., from radar 132 in FIG. 1) associated with a predefined region (e.g., predefined region 101 in FIG. 2) of a vicinity of the vehicle, camera data (e.g., from camera 131 in FIG. 1) associated with the predefined region (e.g., predefined region 101 in FIG. 2), lidar data (e.g., from lidar 133 in FIG. 1) associated with the predefined region (e.g., predefined region 101 in FIG. 2), or sonar data (e.g., from sonar 134 in FIG. 1) associated with the predefined region (e.g., predefined region 101 in FIG. 2).

The camera data can be received for example from one or more of: a thermal imager camera, an infrared camera, a stereo camera, a time of flight camera, an RGB camera, a 2-D camera, a 3-D camera, a 360-degree camera, etc. The radar data can be received for example from one or more of: an imaging radar, a 3-D radar, a 4-D radar, a short-range radar, a medium-range radar, a long-range radar, a pulse-Doppler radar, a frequency-modulated continuous-wave (FMCW) radar, etc. The lidar data can be received for example from one or more of: an amplitude modulated lidar, a frequency modulated lidar, a mechanical lidar, a micro-electromechanical systems lidar, a flash lidar, an optical phase array lidar, a frequency-modulated continuous-wave (FMCW) lidar, a time of flight scanning lidar, etc. The sonar data can be received for example from one or more of: an active sonar, a passive sonar, etc. Of course, other types of sensors exist and the examples above are not meant to be exhaustive.

At 302, the method continues with detecting, via the processor (e.g., processor 120 of FIG. 1) and based on at least two of the radar data, the camera data, the lidar data, or the sonar data, that no other vehicle and/or other object is present within the predefined region (e.g., predefined region 101 in FIG. 2) during the first time period. The detection of other vehicles and/or other objects present in the predetermined region can be performed using one of a machine learning algorithm or a rule-based algorithm. For example, the processor (e.g., processor 120 of in FIG. 1) can use software algorithm(s) such as a machine learning algorithm(s) (e.g., a computer vision algorithm that uses a library of programming function such as those in OpenCV) or a rule-based algorithm(s), to identify any type of object in an image captured by the camera (or lidar, radar, sonar). Examples of objects to be detected can include one or more of vehicles, pedestrians, animals, obstacles, tire splash, splatter of rain, splatter of snow/hail, splatter of mud, splatter of bugs, etc. Of course, other types of objects can be detected in the predetermined region and the examples above are not meant to be exhaustive. The detection of other vehicles and/or other objects present in the predetermined region can prevent (or reduce the chance of) incorrect classification of weather condition.

As mentioned above, at least two of the radar data, the camera data, the lidar data, or the sonar data are used here to detect that no other vehicle and/or object is present within the predefined region. Stated similarly, at least two kinds of sensor data are combined in a process of sensor fusion to obtain the detection result with more accuracy. In some implementations, lidar data and radar data can be combined in sensor fusion. In some implementations, lidar data and camera data can be combined in sensor fusion. In some implementations, lidar data and sonar data can be combined in sensor fusion. In some implementations, lidar data, radar data and camera data can be combined in sensor fusion. In some implementations, lidar data, radar data, camera data and sonar data can be combined in sensor fusion. Of course, any combination of the at least two kinds of sensor can be used, as appropriate, in the process of sensor fusion to get a detection result.

In some implementations, the processor (e.g., processor 120 of in FIG. 1) can detect, based on the lidar data, that no tire splash is present in the predefined region (e.g., predefined region 101 in FIG. 2). The detection of tire splash based on received lidar data can be performed using one of a machine learning algorithm(s) or a rule-based algorithm(s). For example, the processor (e.g., processor 120 of in FIG. 1) can use a software algorithm(s) such as a machine learning algorithm(s) or a rule-based algorithm(s) to detect tire splash.

At 303, in response to detecting no other vehicle is present within the predefined region (e.g., predefined region 101 in FIG. 2) during the first time period, the method continues with classifying an environment of the vehicle during the first time period as one state from a set of states that includes at least one of dry, light rain, heavy rain, light snow, or heavy snow, to produce an environment classification. The classifying is based on at least two of: radar data (e.g., from radar 132 in FIG. 1) associated with the predefined region (e.g., predefined region 101 in FIG. 2), camera data (e.g., from camera 131 in FIG. 1) associated with the predefined region (e.g., predefined region 101 in FIG. 2), lidar data (e.g., from lidar 133 in FIG. 1) associated with the predefined region (e.g., predefined region 101 in FIG. 2), or sonar data (e.g., from sonar 134 in FIG. 1) associated with the predefined region (e.g., predefined region 101 in FIG. 2). In some implementations, the classifying is further based on weather data received at the processor from a remote device (e.g., a third-party compute device providing weather data) via an application programming interface (API) (not shown).

In some implementations, the classifying can be performed using a machine learning algorithm to classify current weather condition and produce the environment classification. For example, the processor (e.g., processor 120, more specifically machine learning module 121) can use a machine learning algorithm(s) to process received sensor data by performing sensor fusion based on at least two of: radar data associated with the predefined region, camera data associated with the predefined region, lidar data associated with the predefined region or sonar data associated with the predefined region, to classify current weather condition and produce the environment classification.

In some implementations, the classifying can be performed using a rule-based algorithm to classify the current weather condition and produce the environment classification. For example, the processor (e.g., processor 120, more specifically rule-based module 122) can use rule-based algorithm(s) to process received sensor data by performing sensor fusion based on at least two of: radar data associated with the predefined region, camera data associated with the predefined region, lidar data associated with the predefined region or sonar data associated with the predefined region, to classify current weather condition and produce the environment classification.

The classifying is based on at least two of: the radar data, the camera data, the lidar data, or the sonar data, to produce an environment classification. Stated similarly, at least two kinds of sensor data are combined in a process of sensor fusion to obtain the classification result with more accuracy. In some implementations, lidar data and radar data can be combined in sensor fusion. In some implementations, lidar data and camera data can be combined in sensor fusion. In some implementations, lidar data and sonar data can be combined in sensor fusion. In some implementations, lidar data, radar data and camera data can be combined in sensor fusion. In some implementations, lidar data, radar data, camera data and sonar data can be combined in sensor fusion. Of course, any combination of the at least two kinds of sensor can be used, as appropriate, in the process of sensor fusion to get a classification result.

In some implementations, the processor (e.g., processor 120 of in FIG. 1) can detect, based on the lidar data, that no tire splash is present in the predefined region (e.g., predefined region 101 in FIG. 2). And the classifying is further in response to detecting no tire splash is present in the predefined region (e.g., predefined region 101 in FIG. 2).

In some implementations, the classifying includes generating a point cloud based on the lidar data. In some other implementations, the classifying includes generating a point cloud based on sensor fusion that includes lidar data and at least one of radar data, camera data and sonar data. Processing raw lidar data to generate point cloud can be accomplished, for example, by commercial available software such as AutoCAD, ReCap, Revit, Bentley, Leica, Faro, Riegl, Trimble, Geo-matching, etc., and open-source software such as Cloudcompare, Point Cloud Library (PCL), etc. The point cloud is a set of points that are used to describe the object detected by lidar (e.g., lidar 133 in FIG. 1) associated with the predefined region (e.g., predefined region 101 in FIG. 2). Elevations for the ground, buildings, signs, lane markers, shoulder areas, roads, motorway overpasses, other vehicles, pedestrians, animals, trees, obstacles, and anything else that the lidar can detect constitutes point cloud data. Additionally or alternatively, point cloud from the lidar data can include representations of attributes associated with an external environment of the vehicle, for example, location, type, relative distance, size, shape, etc. of signs, lane markers, shoulder areas, roads, buildings, other vehicles, pedestrians, animals, trees, obstacles, and anything else that the lidar can detect.

In some implementations, lidar data received at the processor (e.g., processor 120 of in FIG. 1) has a frame rate (in the unit of frame per second). Each frame of lidar data can be processed to generate a point cloud frame. Each point cloud frame is a set of points that can be used to form the object detected in the given frame of lidar data. Thus, during the first time period, a plurality of frames of point cloud can be generated by a plurality of frames of lidar data. In some implementations, number of points on each point cloud frame can be counted and processed to classify the environment condition.

Figures 6A, 6B:
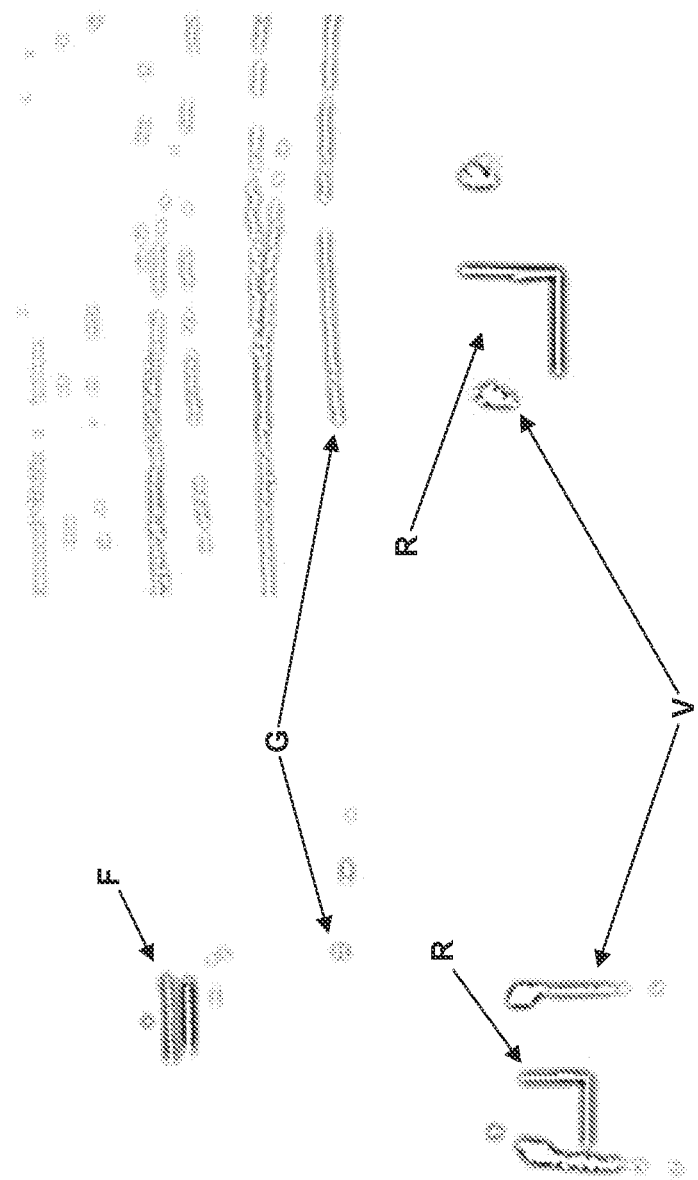
FIGS. 6A and 6B show an example of a point cloud frame generated in a situation of heavy rain, and no rain, respectively.

In some implementations, number of points on each point cloud frame can be counted and processed to classify the environment condition. As an example, in a situation of rain, the number of points in the point cloud generated from the lidar data is less than a situation of no rain, because moisture in the air or water on the road attenuates the lidar signal. FIG. 6A shows a point cloud frame generated in a situation of heavy rain. FIG. 6B shows a point cloud frame generated in a situation of no rain. The points labelled "F" in FIG. 6A are points from a vehicle in front of a subject vehicle. The points labelled "G" in FIGS. 6A-B are points from the ground/roadway (there can be fewer such points, for example, in the presence of heavy rain). The points labelled "R" in FIGS. 6A-B represent reference frames collocated with the vehicle. The points labelled "V" in FIGS. 6A-B are points from the vehicle's own body. As can be seen in FIG. 6A and FIG. 6B, the number of points in FIG. 6B (no rain) is more than the number of points in FIG. 6A (heavy rain). Fog and haze has similar effects for lidar data. A situation of snow, on the other hand, can lead to a result of the number of points in the point cloud generated from the lidar data being more than a situation of no snow because the lidar detects more falling snowflakes in the predetermined region (e.g., predefined region 101 in FIG. 2).

The processor (e.g., processor 120) classifies each point cloud frame in the first time period and assigns a state to each point cloud frame. The state assigned to each point cloud frame is selected from a set of states that includes for example at least one of dry, light rain, heavy rain, light snow, heavy snow, light fog, heavy fog, light haze, or heavy haze. Of course, fewer states or more states can be possibly used, as appropriate, to define different kinds of weather conditions. The list of states above is not meant to be exclusive and not all the states in the list are required in classifying the state of the point cloud frame. In some implementations, a set of states that includes dry, light rain, heavy rain are used in the classification step. In some implementations, a set of states that includes dry, light snow, heavy snow are used in the classification step. In some implementations, a set of states that includes dry, light rain, heavy rain are used in the classification step. In some implementations, a set of states that includes dry, light fog, heavy fog are used in the classification step. In some implementations, a set of states that includes dry, light haze, or heavy haze are used in the classification step. In some implementations, a set of states that includes dry, light rain, heavy rain, light snow, heavy snow are used in the classification step. Any combination of the states can be used, as appropriate, to define different kind of weather condition.

The states assigned to each point cloud frame during the first time period is collected and a fraction is calculated for different kind of states. In a situation of rain, for example, a fraction of heavy rain is calculated as the number of frames of point cloud with states of heavy rain divided by the total number of frames of point cloud. Similarly, a fraction of light rain is calculated as the number of frames of point cloud with states of light rain divided by the total number of frames of point cloud. If the fraction of heavy rain is larger than a predetermined number, the processor produces the final environmental classification as heavy rain. If the fraction of light rain is larger than the predetermined number, the processor produces the final environmental classification as light rain. Otherwise, the processor produces the final environmental classification as dry. The classification process is performed using, for example, a rule-based algorithm or a machine learning algorithm.

At 304, an operational parameter of the vehicle (e.g., vehicle 100 in FIG. 1) is modified based on the environment classification. Examples of modifying an operational parameter(s) include, but are not limited to: changing driving speed, adjusting speed of windshield wiper, activating defogging system automatically, executing a fail-safe trajectory (i.e., safely navigate to a safe location and disable the vehicle), or changing limits on maximum steering angle. Of course, other types of operational parameters can be modified, as appropriate, to ensure that the vehicle is driving in a safe manner.

Figure 4:
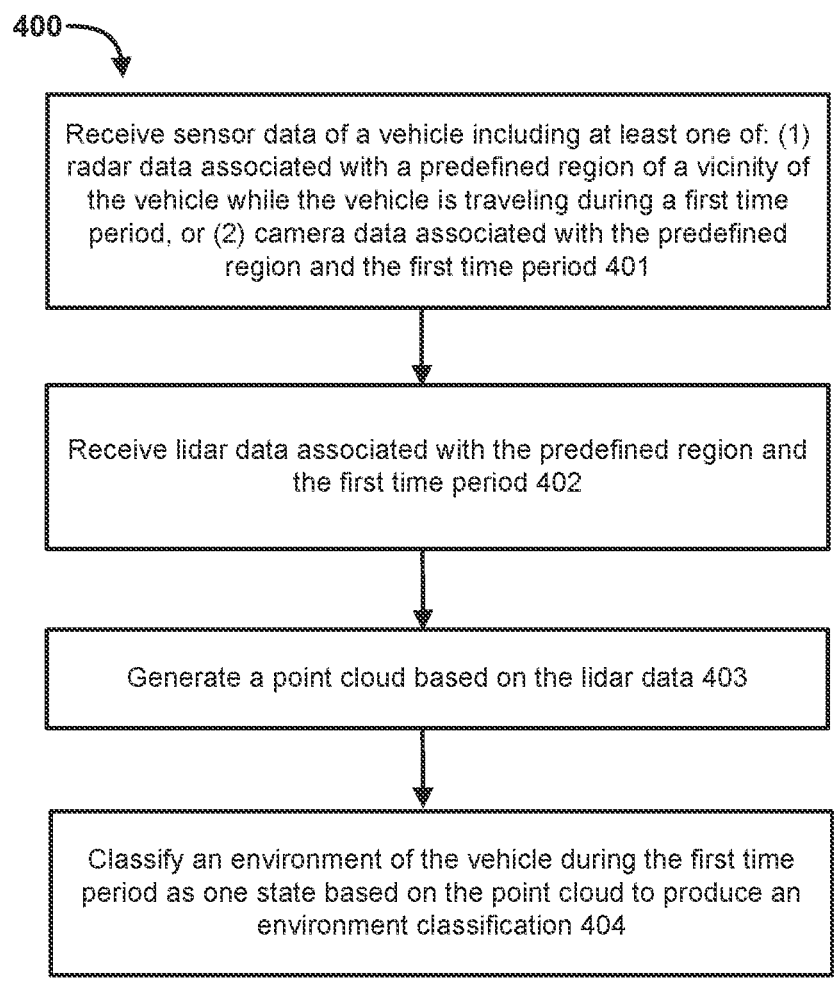
FIG. 4 is a flow diagram of a method for precipitation detection, according to another embodiment.

FIG. 4 is a flow diagram of a method for precipitation detection, according to another embodiment. The method 400 of FIG. 4 can be implemented, for example, using the processor 120 and ECU 140 of the vehicle 100 in FIG. 1.

As shown in FIG. 4, the method 400 begins with receiving, at a processor (e.g., processor 120 in FIG. 1) of a vehicle (e.g., vehicle 100 in FIG. 1), at 401, at least one kind of sensor data from sensors (e.g., sensor(s) 130 in FIG. 1) of the vehicle while the vehicle is traveling during a first time period. The sensor data received can be at least one of: radar data (e.g., from radar 132 in FIG. 1) associated with a predefined region (e.g., predefined region 101 in FIG. 2) of a vicinity of the vehicle and the first time period, or camera data (e.g., from camera 131 in FIG. 1) associated with the predefined region (e.g., predefined region 101 in FIG. 2) and the first time period.

The camera data can be received for example from one or more of: a thermal imager camera, an infrared camera, a stereo camera, a time of flight camera, an RGB camera, a 2-D camera, a 3-D camera, a 360-degree camera, etc. The radar data can be received for example from one or more of: an imaging radar, a 3-D radar, a 4-D radar, a short-range radar, a medium-range radar, a long-range radar, a pulse-Doppler radar, a frequency-modulated continuous-wave (FMCW) radar, etc. Of course, other types of sensors exist and the examples above are not meant to be exhaustive.

At 402, lidar data (e.g., from lidar 133 in FIG. 1) associated with the predefined region (e.g., predefined region 101 in FIG. 2) and the first time period is received at the processor (e.g., processor 120 in FIG. 1). The lidar data can be received for example from one or more of: an amplitude modulated lidar, a frequency modulated lidar, a mechanical lidar, a microelectromechanical systems lidar, a flash lidar, an optical phase array lidar, a frequency-modulated continuous-wave (FMCW) lidar, a time of flight scanning lidar, etc. Of course, other types of sensors exist and the examples above are not meant to be exhaustive.

At 403, a point cloud is generated based on the lidar data. In some implementations, the point cloud is generated based on the lidar data. In some other implementations, the point cloud is generated based on lidar data and at least one of radar data, camera data and sonar data in a process of sensor fusion. Processing raw lidar data to generate point cloud can be accomplished, for example, by commercial available software such as AutoCAD, ReCap, Revit, Bentley, Leica, Faro, Riegl, Trimble, Geo-matching, etc., and open-source software such as Cloudcompare, Point Cloud Library (PCL), etc. The point cloud is a set of points that are used to describe the vehicle and/or other object detected by lidar (e.g., lidar 133 in FIG. 1) associated with the predefined region (e.g., predefined region 101 in FIG. 2). Elevations for the ground, buildings, signs, lane markers, shoulder areas, roads, motorway overpasses, other vehicles, pedestrians, animals, trees, obstacles, and anything else that the lidar can detect constitutes point cloud data. Additionally or alternatively, point cloud from the lidar data can include representations of attributes associated with an external environment of the vehicle, for example, locations, types, relative distances, sizes, shapes, etc. of signs, lane markers, shoulder areas, roads, buildings, other vehicles, pedestrians, animals, trees, obstacles, and anything else that the lidar can detect. At 404, an environment of the vehicle during the first time period is classified as one state based on the point cloud to produce an environment classification. The state is selected from a set of states that includes for example at least one of no rain, light rain, heavy rain, light snow, or heavy snow.

In some implementations, lidar data received at the processor (e.g., processor 120 of in FIG. 1) has a frame rate (in the unit of frame per second). Each frame of lidar data can be processed to generate a point cloud frame. Each point cloud frame is a set of points that can be used to form the object detected in the given frame of lidar data. Thus, during the first time period, a plurality of frames of point cloud can be generated by a plurality of frame of lidar data. In some implementations, the classifying includes transforming the point cloud to a point cloud having a predefined reference frame. The predefined reference frame can have local coordinate system of the vehicle or the sensor(s), or it can have a global coordinate system. For example, lidar (lidar 133 in FIG. 1) has its own local reference frame and local coordinates. Similarly, camera (camera 131 in FIG. 1) has its own local reference frame and local coordinates. Radar (radar 132 in FIG. 1) has its own local reference frame and local coordinates. Sonar (sonar 134 in FIG. 1) has its own local reference frame and local coordinates. In the process of sensor fusion, a global reference frame and global coordinate system is defined. Data with local reference frame and local coordinates from different sensors are transformed onto the global coordinates and global reference frame to be combined in the sensor fusion process.

Figure 7:
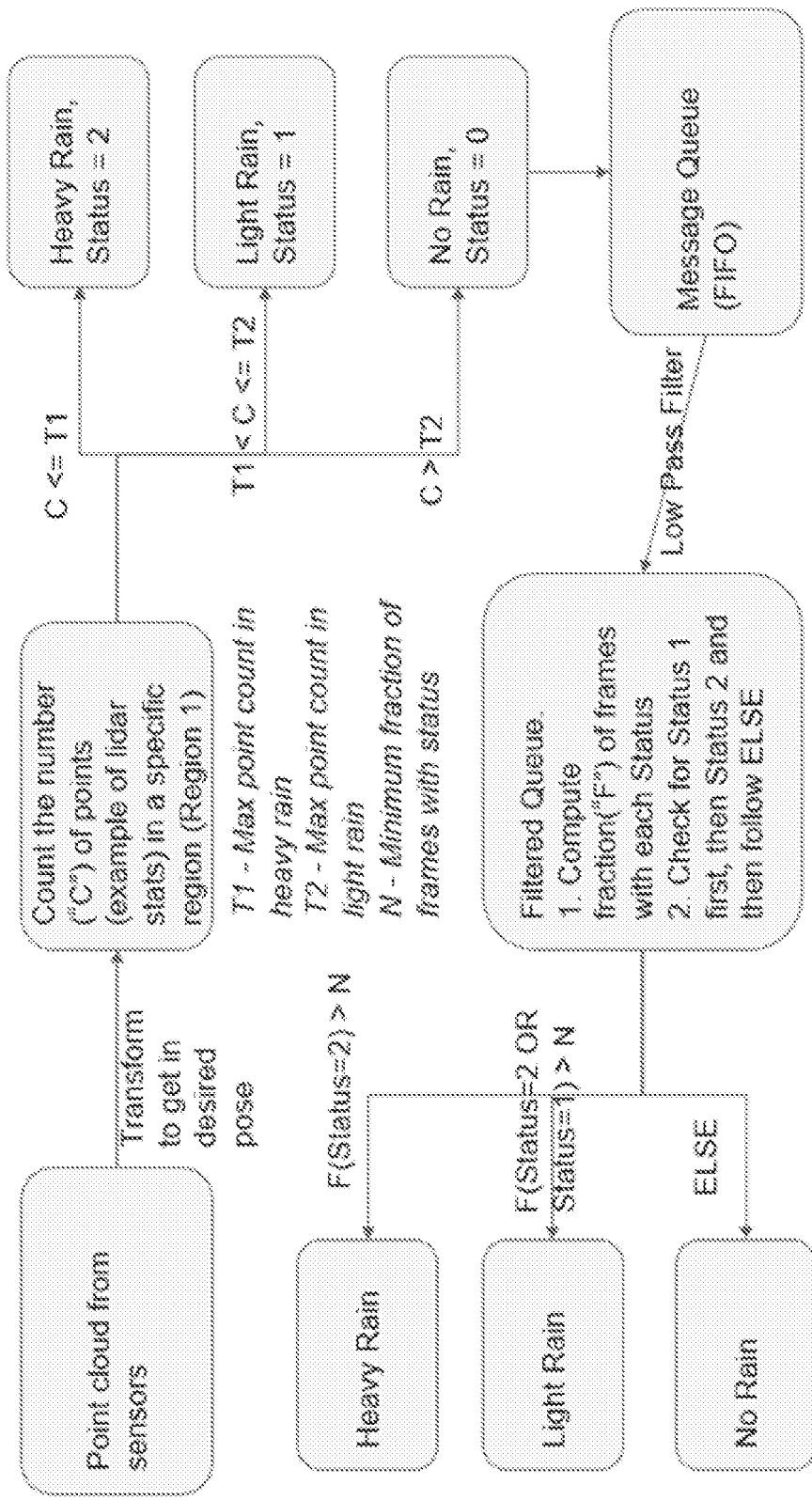
FIG. 7 shows an example of flow diagram of a method for precipitation detection using point cloud, according to an embodiment.

As shown in FIG. 7, in an example of rain, a maximum number of points in heavy rain T1 and a maximum number of points in light rain T2 can be defined. Number of points ("C") on each point cloud frame can be counted and compared to T1 and T2 to classify an environment condition. For example, as shown in FIG. 7, in a situation of rain, number of points in the point cloud frame generated from the lidar data is less than a situation of no rain, because moisture in the air and/or water on the road attenuates lidar signal. FIG. 6A shows a point cloud frame generated in a situation of heavy rain. FIG. 6B shows a point cloud frame generated in a situation of no rain. As shown in FIG. 6A and FIG. 6B, the number of points in FIG. 6B (no rain) is more than the number of points in FIG. 6A (heavy rain). Fog and haze has similar effects for lidar data. Fog and haze have similar effects for lidar data. A situation of snow, on the other hand, can lead to a result of a number of points in the point cloud frame generated from the lidar data that is greater than for a situation of no snow because the lidar detects falling snowflakes in the predetermined region (e.g., predefined region 101 in FIG. 2).

In some implementations, the classifying includes determining a point count for the point cloud and assigning the environment classification to the environment of the vehicle based on the point count. The processor (e.g., processor 120) classifies each point cloud frame in the first time period and assigns a status to each point cloud frame. The state assigned to each point cloud frame is selected from a set of states that includes for example at least one of dry, light rain, heavy rain, light snow, heavy snow, light fog, heavy fog, light haze, or heavy haze. Of course, fewer states or more states can be possibly used, as appropriate, to define different kind of weather condition. The list of states above is not meant to be exclusive and not all the states in the list are required in classifying the state of the point cloud frame. In some implementations, a set of states that includes dry, light rain, heavy rain are used in the classification step. In some implementations, a set of states that includes dry, light snow, heavy snow are used in the classification step. In some implementations, a set of states that includes dry, light rain, heavy rain are used in the classification step. In some implementations, a set of states that includes dry, light fog, heavy fog are used in the classification step. In some implementations, a set of states that includes dry, light haze, or heavy haze are used in the classification step. In some implementations, a set of states that includes dry, light rain, heavy rain, light snow, heavy snow are used in the classification step. Any combination of the states can be used, as appropriate, to define different kind of weather condition.

As shown in FIG. 7, in a situation of rain, number of points in each frame of the point cloud is counted to get a result C. If C is less or equal to T1 (maximum number of points in heavy rain), a state of heavy rain is assigned to the given point cloud frame. If C is less or equal to T2 (maximum number of points in light rain), and greater than T1, a state of light rain is assigned to the given point cloud frame. If C is greater than T2, a state of no rain is assigned to the given point cloud frame. In some implementations, the classifying includes using a filtered queue to assign the environment classification to the environment of the vehicle. The states assigned to each point cloud frame during the first time period is collected in a message queue. The message queue is then filtered through a low pass filter to get a filtered queue. The message queue and the filtered queue can each be located with a memory (e.g., memory 110 of FIG. 1) and accessed by a processor during use (e.g., processor 120 of FIG. 1). In the filtered queue, a fraction is calculated for frames with each states. For example, as shown in FIG. 7, in a situation of rain, the states assigned to each point cloud frame during the first time period (heavy rain, light rain, no rain) is collected in a message queue. The message queue is then filtered through a low pass filter to produce a filtered queue. In the filtered queue, a fraction is calculated for frames with each states (heavy rain, light rain, no rain) to get a result F. A fraction of heavy rain F (heavy rain) is calculated as the number of frames with states of heavy rain divided by the total number of frames. Similarly, a fraction of light rain F (light rain) is calculated as the number of frames with states of light rain divided by the total number of frames. If F (heavy rain) is larger than a predetermined threshold (predetermined fraction N), the processor (e.g., processor 120) produces the final environmental classification as heavy rain. If F (light rain) is larger than the predetermined threshold (predetermined fraction N), the processor produces the final environmental classification as light rain. Otherwise, the processor produces the final environmental classification as dry. The classification process is performed using, for example, a rule-based algorithm or a machine learning algorithm.

In some implementations, the classifying includes assigning a status, from a plurality of statuses, to each frame from a plurality of frames associated with the point cloud, and assigning the environment classification to the environment of the vehicle based on a determination that a predefined fraction of the plurality of frames has the status. As mentioned above, the processor (e.g., processor 120) classifies each point cloud frame in the first time period and assigns a status to each point cloud frame. The states assigned to each point cloud frame during the first time period is collected in a message queue. The message queue is then filtered through a low pass filter to produce a filtered queue. In the filtered queue, a fraction is calculated for frames with each states. For example, as shown in FIG. 7, in a situation of rain, the states assigned to each point cloud frame during the first time period (heavy rain, light rain, no rain) is collected in a message queue. The message queue is then filtered through a low pass filter to get a filtered queue. In the filtered queue, a fraction is calculated for frames with each states (heavy rain, light rain, no rain) to get a result F. A fraction of heavy rain F (heavy rain) is calculated as the number of frames with states of heavy rain divided by the total number of frames. Similarly, a fraction of light rain F (light rain) is calculated as the number of frames with states of light rain divided by the total number of frames. If F (heavy rain) is larger than a predetermined threshold (predetermined fraction N), the processor (e.g., processor 120) produces the final environmental classification as heavy rain. If F (light rain) is larger than the predetermined threshold (predetermined fraction N), the processor produces the final environmental classification as light rain. Otherwise, the processor produces the final environmental classification as dry. The classification process is performed using, for example, a rule-based algorithm or a machine learning algorithm.

In some implementations, an operational parameter of the vehicle (e.g., vehicle 100 in FIG. 1) is modified based on the environment classification. Examples of modifying operational parameters include, but are not limited to: changing driving speed, adjusting speed of windshield wiper, activating defogging system automatically, executing a fail-safe trajectory (i.e., safely navigate to a safe location and disable the vehicle), or changing limits on maximum steering angle. Of course, other types of operational parameters can be modified, as appropriate, to ensure that the vehicle is driving in a safe manner.

Figure 5:
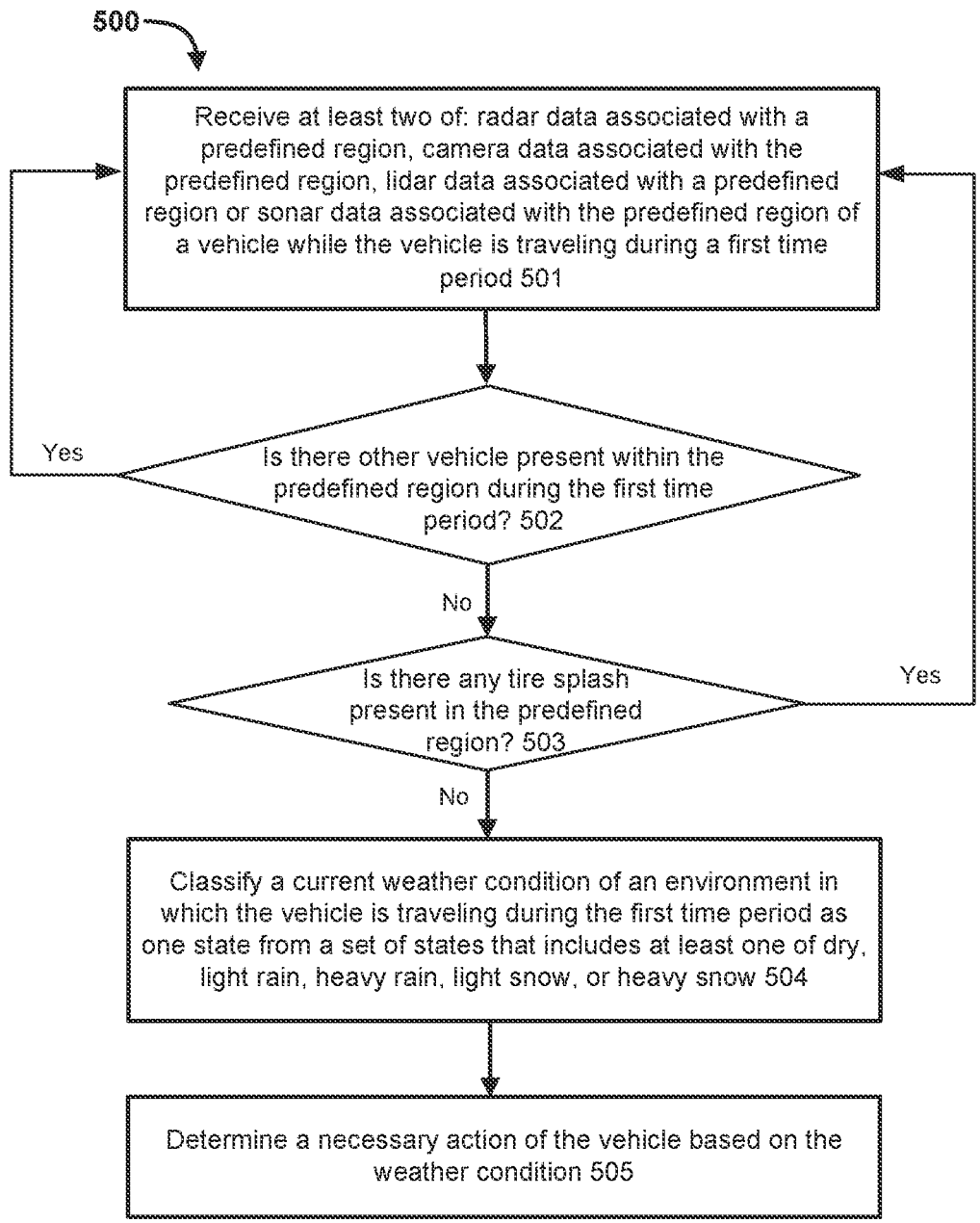
FIG. 5 is a flow diagram of a method for precipitation detection, according to yet another embodiment.

FIG. 5 is a flow diagram of a method for precipitation detection, according to yet another embodiment. The method 500 of FIG. 5 can be implemented, for example, using the processor 120 and the ECU 140 of the vehicle 100 in FIG. 1.

As shown in FIG. 5, the method 500 begins with receiving, at 501, at least two kinds of sensor data from sensors (e.g., sensor(s) 130 in FIG. 1) of a vehicle (e.g., vehicle 100 in FIG. 1) while the vehicle is traveling during a first time period. The sensor data received can be at least two of: radar data (e.g., from radar 132 in FIG. 1) associated with a predefined region (e.g., predefined region 101 in FIG. 2) of a vicinity of the vehicle, camera data (e.g., from camera 131 in FIG. 1) associated with the predefined region (e.g., predefined region 101 in FIG. 2), lidar data (e.g., from lidar 133 in FIG. 1) associated with the predefined region (e.g., predefined region 101 in FIG. 2) or sonar data (e.g., from sonar 134 in FIG. 1) associated with the predefined region (e.g., predefined region 101 in FIG. 2).

The camera data can be received for example from one or more of: a thermal imager camera, an infrared camera, a stereo camera, a time of flight camera, an RGB camera, a 2-D camera, a 3-D camera, a 360-degree camera, etc. The radar data can be received for example from one or more of: an imaging radar, a 3-D radar, a 4-D radar, a short-range radar, a medium-range radar, a long-range radar, a pulse-Doppler radar, a frequency-modulated continuous-wave (FMCW) radar, etc. The lidar data can be received for example from one or more of: an amplitude modulated lidar, a frequency modulated lidar, a mechanical lidar, a microelectromechanical systems lidar, a flash lidar, an optical phase array lidar, a frequency-modulated continuous-wave (FMCW) lidar, a time of flight scanning lidar, etc. The sonar data can be received from one or more of: an active sonar, a passive sonar, etc. Of course, other types of sensors exist and the examples above are not meant to be exhaustive.

At 502, the method continues to detect, whether other vehicle and/or other object is present within the predefined region (e.g., predefined region 101 in FIG. 2) based on at least two of the radar data, the camera data, the lidar data, or the sonar data. If there is other vehicle and/or other object present in the predefined region, method return back to 501. If no other vehicle and/or other object is present within the predefined region during the first time period, method continues to step 503. The detection of other vehicles and/or other objects present in the predetermined region can be performed for example using one of a machine learning algorithm or a rule-based algorithm. For example, the processor (e.g., processor 120 of in FIG. 1) can use a software algorithm(s) such as machine learning algorithms (e.g., a computer vision algorithm that uses a library of programming function such as those in OpenCV) or rule-based algorithms to identify any type of object in an image captured by the camera (or lidar, radar, sonar). Examples of objects to be detected can include for example one or more of: vehicles, pedestrians, animals, obstacles, tire splash, splatter of rain, splatter of snow/hail, splatter of mud, splatter of bugs, etc. Of course, other types of objects can be detected in the predetermined region and the examples above are not meant to be exhaustive. The detection of other vehicles and/or other objects present in the predetermined region can prevent (or reduce the chance of) incorrect result in classification of weather condition.

As mentioned above, at least two of the radar data, the camera data, the lidar data, or the sonar data are used here to detect that no other vehicle and/or object is present within the predefined region. Stated similarly, at least two kinds of sensor data are combined in a process of sensor fusion to obtain the detection result with more accuracy. In some implementations, lidar data and radar data can be combined in sensor fusion. In some implementations, lidar data and camera data can be combined in sensor fusion. In some implementations, lidar data and sonar data can be combined in sensor fusion. In some implementations, lidar data, radar data and camera data can be combined in sensor fusion. In some implementations, lidar data, radar data, camera data and sonar data can be combined in sensor fusion. Of course, any combination of the at least two kinds of sensor can be used, as appropriate, in the process of sensor fusion to get a detection result.

At 503, the method continues to detect, whether tire splash is present in the predefined region (e.g., predefined region 101 in FIG. 2) based on at least one of the camera data or the lidar data. If there is tire splash present in the predefined region, the method returns to step 501. If no tire splash is present within the predefined region during the first time period, method continues to 504. The detection of other tire splash and/or other objects present in the predetermined region can be performed using for example a machine learning algorithm and/or a rule-based algorithm. For example, the processor (e.g., processor 120 of in FIG. 1) can use a software algorithm(s) such as a machine learning algorithm(s) (e.g., a computer vision algorithm that uses a library of programming function such as those in OpenCV) and/or a rule-based algorithm(s) to identify any type of object in an image captured by the camera (or lidar, radar, sonar). Examples of objects to be detected can include one or more of tire splash, vehicles, pedestrians, animals, obstacles, tire splash, splatter of rain, splatter of snow/hail, splatter of mud, splatter of bugs, etc. Of course, other types of objects can be detected in the predetermined region and the examples above are not meant to be exhaustive. The detection of tire splash and/or other objects present in the predetermined region can prevent (or reduce the chance of) incorrect result in classification of weather condition.

At 504, method continues to classify a current weather condition of an environment in which the vehicle is traveling during the first time period as one state from a set of states that includes for example at least one of dry, light rain, heavy rain, light snow, or heavy snow. The state assigned is selected from a set of states that includes for example at least one of dry, light rain, heavy rain, light snow, heavy snow, light fog, heavy fog, light haze, or heavy haze. Of course, fewer states or more states can be possibly used, as appropriate, to define different kind of weather condition. The list of states above is not meant to be exclusive and not all the states in the list are required in classifying the state of the point cloud frame. In some implementations, a set of states that includes dry, light rain, heavy rain are used in the classification step. In some implementations, a set of states that includes dry, light snow, heavy snow are used in the classification step. In some implementations, a set of states that includes dry, light rain, heavy rain are used in the classification step. In some implementations, a set of states that includes dry, light fog, heavy fog are used in the classification step. In some implementations, a set of states that includes dry, light haze, or heavy haze are used in the classification step. In some implementations, a set of states that includes dry, light rain, heavy rain, light snow, heavy snow are used in the classification step. Any combination of the states can be used, as appropriate, to define different kind of weather condition.

In some implementations, the classifying can be performed using a machine learning algorithm to classify current weather condition and produce the environment classification. For example, the processor (e.g., processor 120, more specifically machine learning module 121) is configured to use a machine learning algorithm(s) to process received sensor data by performing sensor fusion based on radar data associated with the predefined region, camera data associated with the predefined region, lidar data associated with the predefined region, to classify current weather condition and produce the environment classification. In some implementations, the classifying is based on weather data received at the processor via an application programming interface (API) (not shown).

In some implementations, the classifying can be performed using a rule-based algorithm to classify current weather condition and produce the environment classification. For example, the processor (e.g., processor 120, more specifically rule-based module 122) is configured to use a rule-based algorithm(s) to process received sensor data by performing sensor fusion based on radar data associated with the predefined region, camera data associated with the predefined region, lidar data associated with the predefined region, to classify current weather condition and produce the environment classification. In some implementations, the classifying is based on weather data received at the processor via an application programming interface (API) (not shown).

The classifying is based on at least two of: the radar data, the camera data, the lidar data, or the sonar data, to produce an environment classification. Stated similarly, at least two kinds of sensor data are combined in a process of sensor fusion to obtain the classification result with more accuracy. In some implementations, lidar data and radar data can be combined in sensor fusion. In some implementations, lidar data and camera data can be combined in sensor fusion. In some implementations, lidar data and sonar data can be combined in sensor fusion. In some implementations, lidar data, radar data and camera data can be combined in sensor fusion. In some implementations, lidar data, radar data, camera data and sonar data can be combined in sensor fusion. Of course, any combination of the at least two kinds of sensor can be used, as appropriate, in the process of sensor fusion to get a classification result.

At 505, method continues to determine an action (e.g., an autonomous action) of the vehicle based on the current weather condition. The action can be performed by a vehicle control module (e.g., part of the ECU 140 of FIG. 1 or an additional control module on the vehicle not shown in FIG. 1) of the vehicle (e.g., vehicle 100 of FIG. 1). Additional information related to performing actions via vehicle control modules is provided in each of U.S. Patent Publication No. 2019/0185011, U.S. Patent Publication No. 2019/0185012, and U.S. Pat. No. 11,130,497, the contents of which are incorporated in their entireties herein. Examples of an action include, but are not limited to: changing driving speed, adjusting speed of windshield wiper, activating defogging system automatically, executing a fail-safe trajectory (i.e., safely navigate to a safe location and disable the vehicle), changing limits on maximum steering angle, modifying one or more planned trips associated with the vehicle (e.g., replacing a route of the one or more planned trips with a replacement route having a shorter distance, fewer changes in elevation, and/or less overall change in elevation), or cancelling one or more planned trips associated with the vehicle. Of course, other types of operational parameters can be modified, as appropriate, to ensure that the vehicle is driving in a safe manner.

In some implementations, the processor (e.g., processor 120 of in FIG. 1, more specifically, alert module 123) can generate an alert based on the classifying. The alert can be displayed to a driver of the vehicle, or a signal representing the alert can be transmitted to a remote compute device. The alert(s) to the driver that can be audible, visual, vibrating, or any combination of appropriate type of notification methods.

FIG. 6A shows a point cloud frame generated in a situation of heavy rain. FIG. 6B shows a point cloud frame generated in a situation of no rain. As we can see from FIG. 6A and FIG. 6B, the number of points in FIG. 6B (no rain) is more than the number of points in FIG. 6A (heavy rain).

FIG. 7 shows an example of flow diagram of a method for precipitation detection using point cloud according to an embodiment. As shown in FIG. 7, a point cloud is generated based on the lidar data. In some implementations, the point cloud is generated based on the lidar data. In some other implementations, the point cloud is generated based on lidar data and at least one of radar data, camera data and sonar data in a process of sensor fusion. Processing raw lidar data to generate point cloud can be accomplished by commercial available software such as AutoCAD, ReCap, Revit, Bentley, Leica, Faro, Riegl, Trimble, Geo-matching etc. and open-source software such as Cloudcompare, Point Cloud Library (PCL) etc. The point cloud is a set of points that are used to describe the vehicle and/or other object detected by lidar (e.g., lidar 133 in FIG. 1) associated with the predefined region (e.g., predefined region 101 in FIG. 2). Elevations for the ground, buildings, signs, lane markers, shoulder areas, roads, motorway overpasses, other vehicles, pedestrians, animals, trees, obstacles, and anything else that the lidar can detect constitutes point cloud data. Additionally or alternatively, point cloud from the lidar data can include representations of attributes associated with an external environment of the vehicle, for example, locations, types, relative distances, sizes, shapes, etc. of signs, lane markers, shoulder areas, roads, buildings, other vehicles, pedestrians, animals, trees, obstacles, and anything else that the lidar can detect.

An environment of the vehicle during the first time period is classified as one state based on the point cloud to produce an environment classification. The state is selected from a set of states that includes for example at least one of dry, light rain, heavy rain, light snow, heavy snow, light fog, heavy fog, light haze, or heavy haze. Of course, fewer states or more states can be possibly used, as appropriate, to define different kind of weather condition. The list of states above is not meant to be exclusive and not all the states in the list are required in classifying the state of the point cloud frame. In some implementations, a set of states that includes dry, light rain, heavy rain are used in the classification step. In some implementations, a set of states that includes dry, light snow, heavy snow are used in the classification step. In some implementations, a set of states that includes dry, light rain, heavy rain, are used in the classification step. In some implementations, a set of states that includes dry, light fog, heavy fog are used in the classification step. In some implementations, a set of states that includes dry, light haze, or heavy haze are used in the classification step. In some implementations, a set of states that includes dry, light rain, heavy rain, light snow, heavy snow are used in the classification step. Any combination of the states can be used, as appropriate, to define different kind of weather condition.

In some implementations, lidar data has a frame rate (in the unit of frame per second). Each frame of lidar data can be processed to generate a point cloud frame. Each point cloud frame is a set of points that can be used to form the object detected in the given frame of lidar data. Thus, during the first time period, a plurality of frames of point cloud can be generated by a plurality of frame of lidar data.

Number of points for each point cloud frame is counted and processed to classify the environment condition. As shown in FIG. 7, a maximum number of points in heavy rain T1 and a maximum number of points in light rain T2 is defined. Number of points ("C") on each point cloud frame can be counted and compared to T1 and T2 to classify an environment condition. For example, as shown in FIG. 7, in a situation of rain, number of points in the point cloud frame generated from the lidar data is less than a situation of no rain, because moisture in the air and/or water on the road attenuates lidar signal. FIG. 6A shows a point cloud frame generated in a situation of heavy rain. FIG. 6B shows a point cloud frame generated in a situation of no rain. As we can see from FIG. 6A and FIG. 6B, the number of points in FIG. 6B (no rain) is more than the number of points in FIG. 6A (heavy rain). Fog and haze has similar effects for lidar data. Fog and haze have similar effects for lidar data. A situation of snow, on the other hand, can lead to a result of a number of points in the point cloud frame generated from the lidar data that is greater than for a situation of no snow because the lidar detects falling snowflakes in the predetermined region (e.g., predefined region 101 in FIG. 2).

As mentioned above, number of points in each frame of the point cloud is counted to get a result C. If C is less or equal to T1 (maximum number of points in heavy rain), a state of heavy rain is assigned to the given point cloud frame. If C is less or equal to T2 (maximum number of points in light rain), and greater than T1, a state of light rain is assigned to the given point cloud frame. If C is greater than T2, a state of no rain is assigned to the given point cloud frame. The states assigned to each point cloud frame during the first time period (heavy rain, light rain, no rain) is collected in a message queue. The message queue is then filtered through a low pass filter to get a filtered queue. In the filtered queue, a fraction is calculated for frames with each states (heavy rain, light rain, no rain) to get a result F. A fraction of heavy rain F (heavy rain) is calculated as the number of frames with states of heavy rain divided by the total number of frames. Similarly, a fraction of light rain F (light rain) is calculated as the number of frames with states of light rain divided by the total number of frames. If F (heavy rain) is larger than a predetermined threshold (predetermined fraction N), the processor (e.g., processor 120) produces the final environmental classification as heavy rain. If F (light rain) is larger than the predetermined threshold (predetermined fraction N), the processor produces the final environmental classification as light rain. Otherwise, the processor produces the final environmental classification as dry. The classification process is performed using, for example, a rule-based algorithm or a machine learning algorithm.

In some embodiments, an apparatus includes a processor configured to be disposed with a vehicle and a memory coupled to the processor. The memory storing instructions to cause the processor to receive, at the processor, at least two of: radar data, camera data, lidar data, or sonar data. The at least two of radar data, camera data, lidar data, or sonar data is associated with a predefined region of a vicinity of the vehicle while the vehicle is traveling during a first time period. At least a portion of the vehicle is positioned within the predefined region during the first time period. The memory storing instructions to also cause the processor to detect, via the processor and based on at least two of the radar data, the camera data, or the lidar data, that no other vehicle is present within the predefined region during the first time period. In response to detecting that no other vehicle is present within the predefined region during the first time period, an environment of the vehicle during the first time period is classified as one state from a set of states that includes at least one of dry, light rain, heavy rain, light snow, or heavy snow, based on at least two of: the radar data, the camera data, the lidar data, or the sonar data, to produce an environment classification. An operational parameter of the vehicle based on the environment classification is modified.

In some embodiments, the processor classifies by using a machine learning algorithm.

In some embodiments, the processor classifies by using a rule-based algorithm.

In some embodiments, the processor further classifies based on weather data received at the processor via an application programming interface (API).

In some embodiments, the processor further classifies in response to detecting no tire splash present in the predefined region.

In some embodiments, the memory further stores instructions to cause the processor to detect, based on the lidar data, that no tire splash is present in the predefined region. The classifying is in response to the detecting that no tire splash is present in the predefined region.

In some embodiments, the processor detects that no tire splash is present in the predefined region is performed using one of a machine learning algorithm or a rule-based algorithm.

In some embodiments, the processor classifies by generating a point cloud based on the lidar data.

In some embodiments, the camera data includes thermal imager camera data.

In some embodiments, the lidar data includes at least one of amplitude modulated lidar data or a frequency modulated lidar data.

In some embodiments, the radar data includes data from at least one imaging radar.

In some embodiments, a method includes receiving, at a processor of a vehicle, sensor data including at least one of: (1) radar data associated with a predefined region of a vicinity of the vehicle while the vehicle is traveling during a first time period, or (2) camera data associated with the predefined region and the first time period. The method also includes receiving, at the processor of the vehicle, lidar data associated with the predefined region and the first time period. A point cloud based on the lidar data is generated. An environment of the vehicle during the first time period is classified as one state from a set of states that includes at least one of no rain, light rain, heavy rain, light snow, or heavy snow, based on the point cloud, to produce an environment classification.

In some embodiments, the method further includes: modifying an operational parameter of the vehicle based on the environment classification.

In some embodiments, the classifying includes transforming the point cloud to a point cloud having a predefined reference frame.

In some embodiments, the classifying includes determining a point count for the point cloud and assigning the environment classification to the environment of the vehicle based on the point count.

In some embodiments, the classifying includes using a filtered queue to assign the environment classification to the environment of the vehicle.

In some embodiments, the classifying includes assigning a status, from a plurality of statuses, to each frame from a plurality of frames associated with the point cloud. The classifying also includes assigning the environment classification to the environment of the vehicle based on a determination that a predefined fraction of the plurality of frames has the classification.

In some embodiments, a non-transitory, processor-readable medium stores processor-executable instructions that, when executed by a processor, cause the processor to receive, at a vehicle, at least two of: radar data associated with a predefined region of a vicinity of the vehicle while the vehicle is traveling during a first time period, camera data associated with the predefined region and the first time period, lidar data associated with the predefined region and the first time period, or sonar data associated with the predefined region and the first time period. A current weather condition of an environment in which the vehicle is traveling during the first time period is classified as one state from a set of states that includes at least one of dry, light rain, heavy rain, light snow, or heavy snow, in response to at least one of: (1) detecting, based on at least two of the radar data, the camera data, or the lidar data, that no other vehicle is present within the predefined region during the first time period, or (2) detecting, based on at least one of the camera data or the lidar data, that no tire splash is present in the predefined region. A next action of the vehicle is determined based on the classification.

In some embodiments, the non-transitory, processor-readable medium further storing processor-executable instructions to cause the processor to: generate an alert based on the classifying. The alert is displayed to a driver of the vehicle, or a signal representing the alert is transmitted to a remote compute device.

In some embodiments, the next action of the vehicle is execution of a fail-safe trajectory.

In some embodiments, the classifying of the current weather condition includes instructions to execute one of a machine learning algorithm or a rule-based algorithm.

In some embodiments, the classifying of the current weather condition is based on weather data received at the processor via an application programming interface (API).

In some embodiments, the classifying of the current weather condition is based on the radar data, the camera data, the lidar data, and weather data received at the processor via an API.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational algorithm, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

As used herein, "substantially concurrently" can refer to events that take place at the same time when adjusted for processing-related delays (e.g., computation delay, transmission delay, etc.), or can refer to events that overlap in time.

As used herein, "substantially in real-time" can refer to an event that occurs immediately following a predicate event, adjusted for processing-related delays (e.g., computation delay, transmission delay, etc.).

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A computer-implemented method, comprising:
    based on at least two of radar data, camera data, lidar data, or sonar data associated with a predefined region and a first time period, detecting, by a computing system, that no vehicle is present within the predefined region during the first time period;
    in response to detecting that no vehicle is present within the predefined region during the first time period, detecting, by the computing system, that no tire splash is present in the predefined region; and
    in response to detecting that no tire splash is present in the predefined region, classifying, by the computing system, an environment of the predefined region during the first time period as one state from a set of states, to produce an environment classification.

2. The computer-implemented method of claim 1, wherein the classifying comprises:
    generating a point cloud based on the lidar data.

3. The computer-implemented method of claim 2, wherein the classifying further comprises:
    transforming the point cloud to a point cloud having a predefined reference frame.

4. The computer-implemented method of claim 2, wherein the classifying further comprises:
    determining a point count for the point cloud and assigning the environment classification to the environment of the predefined region based on the point count.

5. The computer-implemented method of claim 1, wherein the vehicle is a first vehicle, further comprising:
    modifying, by the computing system, an operational parameter of a second vehicle based on the environment classification.

6. The computer-implemented method of claim 1, wherein detection that no tire splash is present in the predefined region is based on one of a machine learning algorithm or a rule-based algorithm.

7. The computer-implemented method of claim 1, wherein the classifying is based on one of a machine learning algorithm or a rule-based algorithm.

8. The computer-implemented method of claim 1, wherein the classifying is based on weather data received via an application programming interface (API).

9. The computer-implemented method of claim 1, wherein the set of states includes at least one of dry, light rain, heavy rain, light snow, or heavy snow.

10. The computer-implemented method of claim 1, wherein the lidar data includes at least one of amplitude modulated lidar data or a frequency modulated lidar data.

11. A computing system, comprising:
a processor;
a memory coupled to the processor, the memory storing instructions that when executed by the processor cause the computing system to perform operations comprising:
- based on at least two of radar data, camera data, lidar data, or sonar data associated with a predefined region and a first time period, detecting that no vehicle is present within the predefined region during the first time period,
- in response to detecting that no vehicle is present within the predefined region during the first time period, detecting that no tire splash is present in the predefined region, and
- in response to detecting that no tire splash is present in the predefined region, classifying an environment of the predefined region during the first time period as one state from a set of states, to produce an environment classification.

12. The computing system of claim 11, wherein the classifying comprises:
generating a point cloud based on the lidar data.

13. The computing system of claim 12, wherein the classifying further comprises:
transforming the point cloud to a point cloud having a predefined reference frame.

14. The computing system of claim 12, wherein the classifying further comprises:
determining a point count for the point cloud and assigning the environment classification to the environment of the predefined region based on the point count.

15. The computing system of claim 11, wherein the vehicle is a first vehicle, the operations further comprising:
modifying an operational parameter of a second vehicle based on the environment classification.

16. A non-transitory, computer-readable medium storing instructions that, when executed by at least one processor of a computing system, cause the computing system to perform operations comprising:
- based on at least two of radar data, camera data, lidar data, or sonar data associated with a predefined region and a first time period, detecting that no vehicle is present within the predefined region during the first time period,
- in response to detecting that no vehicle is present within the predefined region during the first time period, detecting that no tire splash is present in the predefined region, and
- in response to detecting that no tire splash is present in the predefined region, classifying an environment of the predefined region during the first time period as one state from a set of states, to produce an environment classification.

17. The non-transitory, computer-readable medium of claim 16, wherein the classifying comprises:
generating a point cloud based on the lidar data.

18. The non-transitory, computer-readable medium of claim 17, wherein the classifying further comprises:
transforming the point cloud to a point cloud having a predefined reference frame.

19. The non-transitory, computer-readable medium of claim 17, wherein the classifying further comprises:
determining a point count for the point cloud and assigning the environment classification to the environment of the predefined region based on the point count.

20. The non-transitory, computer-readable medium of claim 16, wherein the vehicle is a first vehicle, the operations further comprising:
modifying an operational parameter of a second vehicle based on the environment classification.

* * * * *